Inventors
Morgan D. Wynne, Sr.
Tillet H. Wynne, Jr.

By Mason, Fenwick & Lawrence
Attorneys

Patented Dec. 12, 1950

2,533,865

UNITED STATES PATENT OFFICE 2,533,865

FLY FISHING KIT

Morgan D. Wynne, Sr., and Tillet H. Wynne, Jr., Griffin, Ga.

Application June 7, 1946, Serial No. 675,164

2 Claims. (Cl. 43—57.5)

This invention relates to a fisherman's kit box.

It is a commonly recognized observation that fish are temperamental in their attitude to a spinner, sometimes striking it greedily, at other times refusing it. This is believed to be due to differences in the intensity of light reflection from the spinner under varying conditions of daylight or sunshine. The flash from a bright spinner under brilliant sunlight may be so intense as to scare the fish away from the lure. On the other hand, a dull spinner on a cloudy day or in the shade of woodsy portions of a stream may be insufficiently attractive. Fishermen who have selectively employed light and dull spinners according to varying light conditions have reported more uniform success than when sticking to a single type of spinner.

One of the objects of the invention is to provide a kit box for lures which include spinners having a normally bright but tarnishable surfaces, with facilities for holding, chemical powders selectively usable, one for tarnishing the surface of the spinner, giving it a dull color, the other for restoring its brightness after it has been tarnished.

Another object of the invention is to provide a kit box for the fly and spinner, having flexible sides, and a vial fitting across the kit box, open at both ends and having an intermediate partition, containing the tarnishing powder on one side and the polishing powder on the other, there being a cork in each end, said corks being maintained closed by the pressure of the flexible sides of the kit box, and by which pressure the vial is held in position across the kit box.

A further object of the invention is to provide a flat kit box with flexible sides, to accommodate one or more flies with spinner of the class described, having a fleece mat on the bottom, in which to engage the flies, and containing the vial as described, resting against the mat, the immobility of which imparted by the pressure of the flexible sides of the kit box cause it to retain the mat from slipping when the kit box is carried upright in the pocket.

Other objects of the invention will appear as the following description of a preferred and practical embodiment thereof proceeds.

In the drawings which accompany and form a part of the following specification and throughout the several figures of which the same reference characters have been used to denote identical parts:

Figure 1:
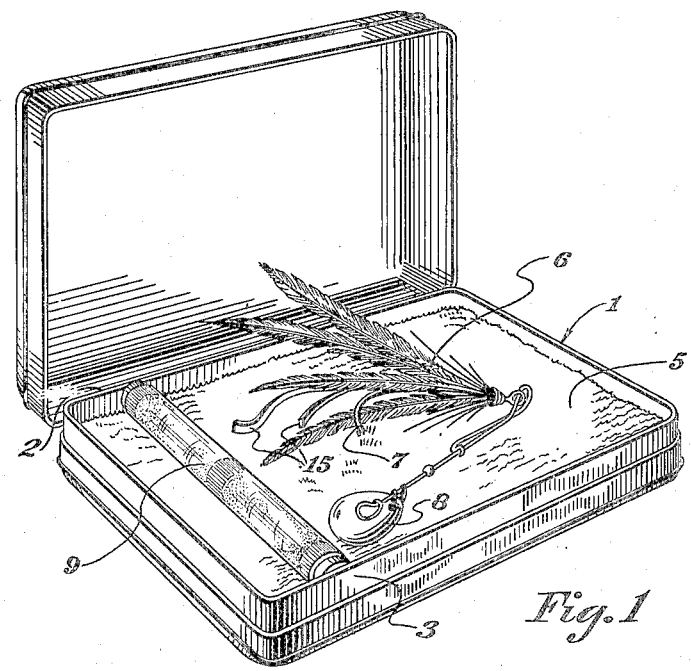
Figure 1 is a perspective view of the fishing kit.

Referring now in detail to the several figures, the numeral 1 represents a flat box which may be made of any suitable material, but is preferably made of transparent plastic. To carry out certain principles of the invention, the sides 2 and 3 are resilient and yielding under pressure. As shown, the box 1 has a hinged lid 4, which telescopes over a reduced free margin of the sides of the box. This box is preferably of such shape that it can be carried in the pocket. A sheepskin mat 5 with the fleece uppermost, is loosely, that is, removably fitted in the bottom of the box. The fleece is for the purpose of engaging the hooks of the flies to hold them in position, it being much easier to disengage the barbs of the hooks from the fleece than from a woven fabric. Figure 1 shows a fly 6, having its hooks 7 thus embedded in the fleece.

Figure 2:
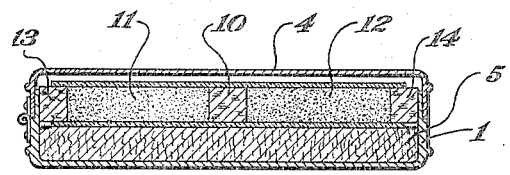
Figure 2 is a vertical cross-section through the same, the lid being closed.

The invention contemplates the use of a spinner 8, in connection with the fly. This spinner may be made of silver or other metal having a normally bright but readily tarnishable surface. The idea is, as may be inferred from the statement of the objects of the invention, to selectively tarnish the surface of the spinner or restore it to brightness after it has been tarnished, according to light conditions. To accomplish this purpose the fishing kit is provided with a vial 9, containing the necessary substances to apply to the spinner in effecting the change in its appearance from bright to dull, or vice versa. The vial is preferably a cylindrical glass tube open at both ends, and having a cork 10 inserted to an intermediate position, forming a middle partition. One side of the vial contains a tarnishing powder 11, which in the case of silver may be potassium sulfide. The other side contains a polishing powder 12, such as whiting. The ends of the vial are closed by corks 13 and 14. The length of the vial, including the projecting portions of the corks is just a little greater than the inside width of the box 1, between the sides 2 and 3, so that when the vial is placed crosswise in the kit box, as shown in Figures 1 and 2, the sides 2 and 3 are slightly forced apart and bear resiliently against the ends of the corks. This resilient pressure has two functions; it keeps the corks in place, and it retains the vial frictionally in fixed position in the kit box.

It will be noted in Figure 1 that the vial is so positioned as to divide the kit box into two compartments, the larger of which contains the fly. The smaller may be used for any purpose, to contain any small piece of paraphernalia, such as extra hooks, not shown. The relative sizes of the compartments may be changed at will, simply by rolling the vial 9 upon the fleece in one or the other direction against the frictional pressure imparted by the sides 2 and 3.

The fly 6 rests against the fleece mat 5, and holds the latter in place, preventing it from slumping in the kit box when the latter is carried upright in the pocket.

In order to tarnish the spinner 8, the latter is moistened and a small quantity of the powder 11 rubbed upon it. It quickly turns to a dark shade, the tone of which is governed by the amount of powder employed. To restore the spinner to its original brightness, it is merely necessary to apply a small quantity of the powder 12 to polish off the tarnish film.

While we have in the above description disclosed what we believe to be a preferred and practical embodiment of the invention, it will be understood by those skilled in the art that the specific details of construction and arrangement of parts as illustrated and described are illustrative and not to be construed as restricting the scope of the invention.

What we claim as our invention is:

1. Kit for fishing flies comprising a flat box having resilient yielding opposite parallel sides, a removable fleece mat freely resting upon the bottom of said box, for engagement by the hooks of flies, and a cylindrical vial having a cork in at least one end, arranged crosswise within said box resting against said fleece, the ends of said vial being under pressure of said resilient sides whereby said vial is retained in position with its cork retained in place, and in turn keeps said fleece mat in position.

2. Kit for fishing flies comprising a flat box having a resilient yielding opposite parallel sides, a removable fleece mat freely resting upon the bottom of said box, adapted for engagement by the hooks of flies equipped with spinners having tarnishable bright surfaces, and a cylindrical vial arranged crosswise within said box resting against said fleece, having an intermediate partition providing segregate spaces on opposite sides, one for a tarnishing agent and the other for a polishing agent, a cork in each end of the vial, the ends of said corks being under pressure of said resilient sides whereby said vial is retained in position, the corks retained in position in said vial and the mat kept in position by pressure of said vial.

MORGAN D. WYNNE, Sr.
TILLET H. WYNNE, Jr.

REFERENCES CITED

The following references are of record in the file of this patent:

UNITED STATES PATENTS

| Number | Name | Date |
|---|---|---|
| 254,838 | Peacock | Mar. 14, 1882 |
| 309,905 | Wells | Dec. 30, 1884 |
| 714,844 | Wheeler | Dec. 2, 1902 |
| 821,579 | Austen | May 22, 1906 |
| 952,314 | Ellsworth | Mar. 15, 1910 |
| 1,501,324 | Eisle | July 15, 1924 |
| 1,623,429 | Martinson | Apr. 5, 1927 |
| 1,623,994 | Buchsbaum et al. | Apr. 12, 1927 |
| 1,681,810 | Nelson | Aug. 21, 1928 |
| 1,848,849 | Stone | Mar. 8, 1932 |

OTHER REFERENCES

Catalogue of Fishing Equipment, page 155, published 1940 by Edward Vom Hofe & Co., 92 Fulton St., New York, N. Y. (A copy of this catalogue is located in Div. 2, U. S. Patent Office.)